(12) United States Patent
Frederick et al.

(10) Patent No.: US 7,772,997 B2
(45) Date of Patent: Aug. 10, 2010

(54) REDUCING LEAKAGE NOISE IN DIRECTLY SAMPLED RADIO FREQUENCY SIGNALS

(75) Inventors: Thomas J. Frederick, Chapel Hill, NC (US); Joseph P. Repke, Cary, NC (US)

(73) Assignee: Sirit Technologies, Inc., Toronto (CA)

( * ) Notice: Subject to any disclaimer, the term of this patent is extended or adjusted under 35 U.S.C. 154(b) by 531 days.

(21) Appl. No.: 11/843,781

(22) Filed: Aug. 23, 2007

(65) Prior Publication Data
US 2009/0050685 A1   Feb. 26, 2009

(51) Int. Cl.
*H03M 7/00* (2006.01)
(52) U.S. Cl. .................. 341/50; 235/375; 348/607
(58) Field of Classification Search ............ 341/50–90; 235/451, 375, 435; 348/607, 616; 327/309; 330/151; 333/14
See application file for complete search history.

(56) References Cited

U.S. PATENT DOCUMENTS

| | | | |
|---|---|---|---|
| 5,533,052 A * | 7/1996 | Bhaskar | 375/244 |
| 7,545,306 B2 * | 6/2009 | Frederick et al. | 341/155 |
| 7,598,990 B2 * | 10/2009 | Kakumitsu | 348/241 |
| 2005/0207509 A1 | 9/2005 | Saunders et al. | 375/285 |
| 2006/0033607 A1 | 2/2006 | Bellantoni | 340/10.1 |
| 2006/0098765 A1 | 5/2006 | Thomas et al. | 375/346 |
| 2006/0183454 A1 | 8/2006 | Al-Mahdawi | 455/296 |
| 2008/0041953 A1 * | 2/2008 | Frederick et al. | 235/451 |

\* cited by examiner

*Primary Examiner*—Lam T Mai
(74) *Attorney, Agent, or Firm*—Fish & Richardson P.C.

(57) ABSTRACT

The present disclosure includes a system and method for reducing leakage noise in directly sampled radio frequency signals. In some implementations, a Radio Frequency IDentification (RFID) reader includes an antenna, an Analog-to-Digital Converter (ADC), a synthesizer module, and a Carrier Noise Reduction (CNR) module. The antenna is configured to receive Radio Frequency (RF) signals and pass the RF signals to a receive path. The ADC is configured to directly sample RF signals in the receive path in accordance with a clock signal and generate a digital signal. The synthesizer module is configured to generate the clock signal and a signal used to upconvert a transmitter signal. The clock signal and the upconversion signal are phase locked. The CNR module is configured to reduce leakage noise in the receive path.

24 Claims, 3 Drawing Sheets

REDUCING LEAKAGE NOISE IN DIRECTLY SAMPLED RADIO FREQUENCY SIGNALS

TECHNICAL FIELD

This invention relates to detecting radio frequency signals and, more particularly, to reducing leakage noise in directly sampled radio frequency signals.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

SUMMARY

The present disclosure includes a system and method for reducing leakage noise in directly sampled radio frequency signals. In some implementations, a Radio Frequency IDentification (RFID) reader includes an antenna, an Analog-to-Digital Converter (ADC), a synthesizer module, and a Carrier Noise Reduction (CNR) module. The antenna is configured to receive Radio Frequency (RF) signals and pass the RF signals to a receive path. The ADC is configured to directly sample RF signals in the receive path in accordance with a clock signal and generate a digital signal. The synthesizer module is configured to generate the clock signal and an RF carrier signal used to upconvert the transmitter signal to radio frequencies. The clock signal and the upconversion carrier signal are phase locked. The CNR module is configured to reduce leakage noise in the receive path.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
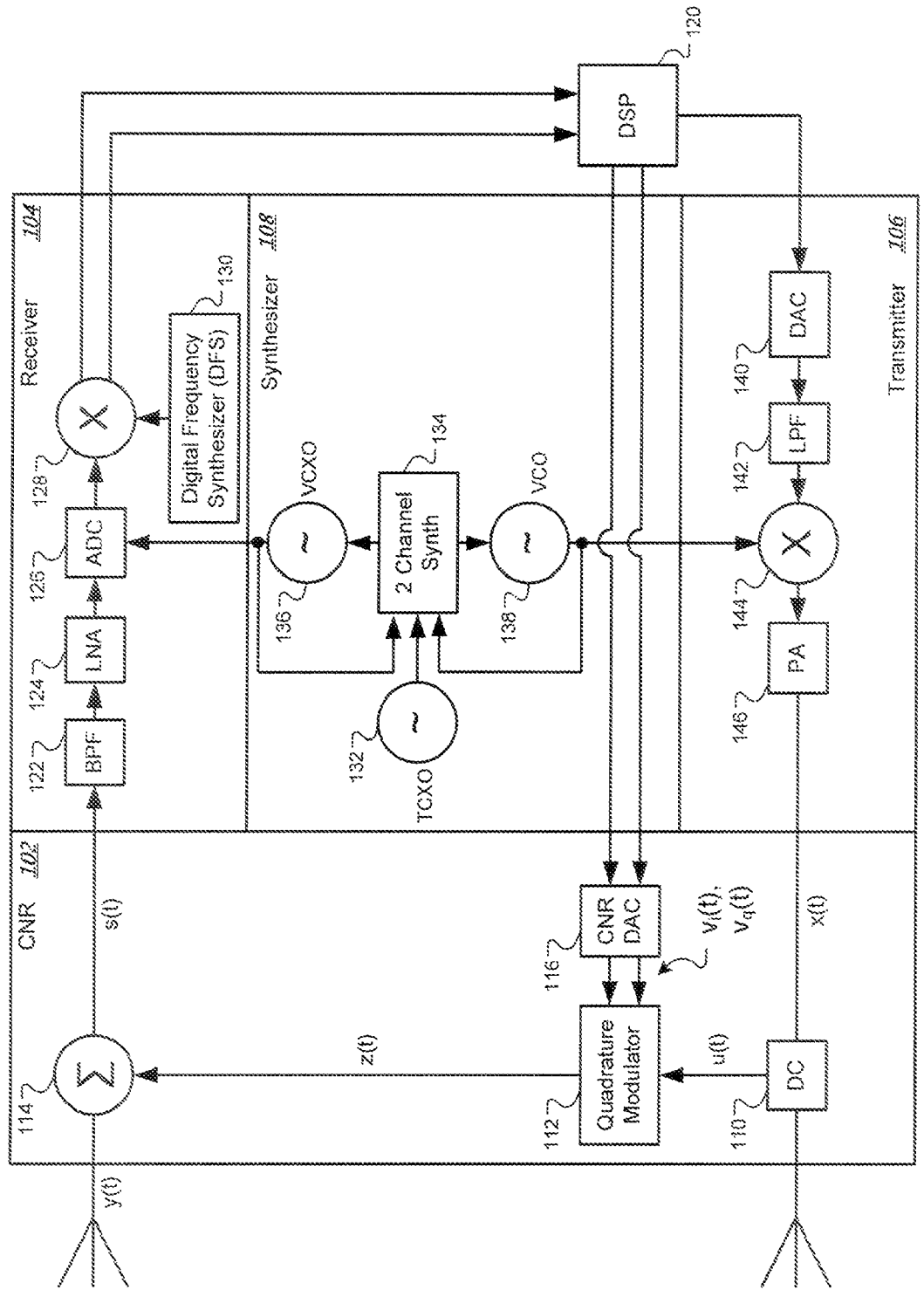
FIG. 1 is a block diagram illustrating an example RFID reader in accordance with some implementations of the present disclosure.

FIG. 1 is an example RFID reader 100 for reducing transmitter leakage signal in a directly sampled Radio Frequency (RF) signal in accordance with some implementations in the present invention. For example, the reader 100 may eliminate, minimize, and/or otherwise reduce transmitter leakage noise using a Carrier Reduction Noise (CNR) section. In some implementations, the reader 100 phase locks a clock signal for an analog-to-digital converter (ADC) that directly samples RF signals and a transmitter oscillator signal that upconverts the transmission signal to radio frequencies. By phase locking these signals, the reader 100 can substantially reduce frequency drift that can interfere with directly sampling RF signals in the receive path of the reader. In other words, the frequency in the receive path and the transmission path substantially match, and in some implementations, the reader 100 can generate substantially linear Direct Coupled (DC) control loops for reducing leakage noise in the receive path.

In general, the leakage signal of concern is interference typically generated from a transmit signal that is added to a receive path. Transmitter leakage into the receive path can be as much as 110 dB above the desired backscattered receive signal. Such a high leakage signal to receive signal ratio can leave the received baseband signals susceptible to typical nonlinearities associated with standard cost-effective analog signal processing components. In the case that a reader has perfect transmitter-to-receiver isolation, only the back-scattered signal from the transponder would make it into the receiver. Leakage associated with the transmit signal frequently generates interference in the receive path and may result from one or more sources such as reflections off other nearby objects in the vicinity, internal circuit reflections caused by non-ideal impedance matching, and/or other sources. In some implementations, the reader 100 offers approximately 40 dB (4 orders of magnitude) of isolation. In an effort to eliminate, minimize or otherwise reduce the leakage signal, the reader 100 may generate control signals that adjust an amplitude and/or phase of a portion of the transmission signal to generate a cancellation signal, i.e., a signal that when added to a receive path can reduce leakage signals. During the course of this description, the leakage current is described in rectangular coordinates but may also be described in other coordinate systems, such as polar. In some implementations, the leakage signal may be expressed as a portion of an in-phase signal and a quadrature signal, as discussed in more detail below.

In the illustrated implementation, the reader 100 includes a carrier-noise-reduction (CNR) module 102, a receiver module 104, a transmitter module 106, and a frequency synthesizer module 108. The CNR module 102 includes any software, hardware, and/or firmware operable to reduce leakage signals in the receive path. For example, the CNR module 102 may introduce signals into the receive path for canceling, minimizing, or otherwise reducing leakage signals. In the illustrated implementation, the CNR module 102 includes a directional coupler 110, a vector modulator 112, a power combiner or summer 114, and a dual digital-to-analog converter (DAC) 116. The directional coupler 110 splits or otherwise directs a portion of the transmit signal to the vector modulator 112. In some implementations, the output of the power amplifier 146 can be represented by x(t) as:

$$x(t) = A\cos(2\pi F_c t),$$

where A is the signal amplitude and $F_c$ is the RF carrier frequency.

The coupled portion of the transmit signal may be expressed as:

$$u(t) = b_1 * A\cos(2\pi F_c t + \theta),$$

where $b_1$ is a fixed small constant (e.g., $b_1=0.2$), $\theta$ is a fixed phase shift of the carrier through the coupler, and u(t) is the output of the directional coupler 110 directed to the vector modulator 112.

Another representation of the RF output from the directional coupler 110 and input to the vector modulator is as follows:

$$u(t)=B(t)\cos(2\pi F_c t+\phi(t)),$$

where B(t) and $\phi(t)$ are slowly varying stochastic processes and $F_c$ is again the RF carrier frequency.

In addition to receiving a portion of the transmit signal, u(t), the vector modulator 112 receives an in-phase control signal $v_i(t)$ and a quadrature control signal $v_q(t)$. In some implementations, the control signals may be polar controls, which may instead control a polar implementation of a vector modulator comprised of a voltage-variable attenuator function with many dB of dynamic range (i.e. greater than 20 dB) and a phase shifter function which may be capable of shifting the phase of the transmit signal over a range of greater than or equal to 360 degrees.

The vector modulator 112 can modulate the portion of the transmit signal (e.g., u(t)) with the baseband quadrature control signals $v_i(t)$ and $v_q(t)$ to generate a cancellation signal for the leakage signal. In some implementations, the vector modulator 112 may comprise a quadrature modulator.

In some implementations, the vector modulator 112 may produce the cancellation signal z(t) winch can be represented as:

$$z(t)=b_2 B(t(v_i(t)\cos(2\pi F_c t+\phi(t))+v_q(t)\sin(2\pi F_c t+\phi(t)))$$

where $b_2$ is a fixed small constant (e.g., $b_2=0.01$), $v_i(j)$ and $v_q(t)$ are the modulation control signals, and B(t) and $\phi(t)$ comprise u(t) as explained above.

In some implementations, the constant $b_2$ accounts for the combined signal attenuation through the directional coupler ($b_d$) and the vector modulator 112. In the example expression for the cancellation signal, z(t), the vector modulator 112 splits the input u(t) into two signals, one version of which is represented by a cosine term, and the second is a 90 degree shifted version of the first, represented by a sine term, then modulates the control signals $v_i(t)$ and $v_q(t)$ onto these cosine and sine carriers, respectively, to produce the cancellation signal.

In some implementations, the CNR module 102 includes the dual DAC 116 for converting digital control signals to analog control signals and directing the analog control signals to the vector modulator 112. In some implementations, the control signals are generated as a sampled data signal and each signal is passed through a digital-to-analog converter (DAC) 116 to create the analog control signals for the vector modulator 112. In other words, the control signals $v_i(t)$ and $v_q(t)$ can comprise digital signals received by the dual DAC 116. In some implementations, the control signals $v_i(t)$ and $v_q(t)$ may be generated from analog control circuitry.

After generating the cancellation signal, the vector modulator 112 directs the cancellation signal to the power combiner, or summer 114. The summer 114 adds the cancellation signal to the signal received from the receive antenna, y(t), which includes the leakage signal plus the desired signal r(t). In the example, the summer 114 adds the vector modulator output signal z(t) to the receiver input y(t) to produce s(t), the output of the summer 114. In this case, z(t) is substantially equal in amplitude and 180 degrees out of phase with the leakage signal to be cancelled. Those skilled in the art shall recognize that other power-combining implementations are possible which introduce non-equal phase shift and/or non-equal amplitude change to each of the two inputs, such as a 90-degree hybrid or a directional coupler. In these cases, the vector modulator output signal z(t) may be compensated by the inverse of this phase and/or amplitude difference such that when z(t) is combined with y(t), the transmitted leakage signal is substantially reduced or removed.

In some implementations, the residual signal s(t) substantially equals the desired receive signal r(t), i.e., substantially all of the transmitter leakage is cancelled. The residual signal s(t) exiting the CNR module 102 and entering the receiver 104 can be represented as:

$$s(t)=b_2 B(t)(c(t)\cdot\cos(2\pi F_c t+\phi(t)+\theta(t))+v_i(t)\cos(2\pi F_c t+\phi(t))+v_q(t)\sin(2\pi F_c t+\phi(t)))+r(t).$$

The receiver module 104 can include any software, hardware, and/or firmware operable to down convert the received signal to baseband signals for processing by the Digital Signal Processor (DSP) 120. For example, the receiver module 104 may convert an RF signal to a baseband signal. In some implementations, the baseband signal is a low frequency signal (e.g., DC to 400 KHz). In addition, the receiver module 104 may perform other functions such as amplification, filtering, conversion between analog and digital signals, and/or others. The receiver module 104 may produce the baseband signals using a mixer and low pass filters. In the illustrated implementations, the receiver module 104 includes a bandpass filter (BPF) 122 and a low noise amplifier (LNA) 124, an ADC 126, a mixer 128 and a digital frequency synthesizer (DFS) 130. The analog BPF 122 receives RF signals from the summer 114 and passes a band of the received RF signals to the LNA 124 while substantially rejecting frequencies out of band. The LNA 124 amplifies the residual signal in light of the relative weakness of the signal to the transmission signal. The ADC 126 converts the analog signal to a digital signal and, in this implementation, directly samples the RF signal in the receive path, in some implementations, the ADC 126 has sampling rates greater than or equal to 60 MHz (e.g., 244 MHz), which can reduce the required selectivity, shape factor and/or complexity of the analog BPF 122. As discussed above, the ADC 126 receives a clock signal phase-locked with the transmitter oscillator signal (discussed in more detail below). The ADC 126 passes the digital signal to the mixer 128. The mixer 128 mixes the digital signal with a signal received from a digital frequency synthesizer 130 to generate two component signals. In the illustrated implementation, the mixer 128 generates an in-phase signal and a quadrature signal. In other words, the mixer 128 mixes down the digital signal to baseband.

The frequency synthesizer module 108 (or more simply, synthesizer module) can include any software, hardware, and/or firmware operable to phase lock the ADC clock signal and the transmitter oscillator signal. In other words, the synthesizer module 108 passes a clock signal to the ADC 126 and a signal to the transmitter module 106 that are substantially phase-coherent. In some implementations, the synthesizer module 108 can eliminate, minimize, or otherwise reduce frequency drift between the receive path and the transmitter path by locking both the clock signal and the transmitter's oscillator signal to a highly-stable reference frequency signal source, such as a temperature-compensated crystal oscillator (TCXO), and thus, by a form of the transitive property, to each other. As mentioned above, the phase lock can, in some implementations, enable the generation of linear DC control loops for reducing transmitter leakage noise in the receive path. In the illustrated implementation, the synthesizer module 108 includes a temperature compensated crystal oscillator (TCXO) 132, a 2 channel Phase-Locked Loop (PLL) synthesizer circuit 134, a voltage controlled crystal oscillator (VCXO) 136, and a voltage controlled oscillator (VCO) 138. In some implementations, the TCXO 132 generates a substantially stable (e.g., within ±5 to ±10 parts-per-million (ppm) accuracy, or better) reference frequency signal and passes the signal to the 2 channel PLL synthesizer 134.

The 2 channel PLL synthesizer 134 receives the oscillating signal from the TCXO 132 and in some implementations divides the frequency of the received signal, by an integer (e.g., 3 or larger) to create a lower comparison frequency for phase-locking the VCXO 136 using the Intermediate Frequency (IF) PLL channel of the 2 channel PLL synthesizer 134. The synthesizer 134 also receives a fed-back portion of the VCXO 136 output signal into its IF channel input, which it frequency-divides down with a separate divisor, also generally an integer, to yield a signal at the same comparison frequency resulting from division of the TCXO 132 output signal described above. For example:

$$F_{comp,IF} = \frac{F_{TCXO}}{R_{IF}} = \frac{F_{VCXO}}{N_{IF}},$$

where $R_{IF}$ is the divisor for the reference (TCXO) frequency, $N_{IF}$ is the divisor for the Intermediate Frequency (IF), and $F_{TCXO}$ and $F_{VCXO}$ are the frequencies of the TCXO 132 and VCXO 136, respectively.

The two signals, both at approximately $F_{comp,IF}$ are input to a phase detector, the output of which is proportional to the phase difference between the two signals. The phase detector's output is then filtered and is used to control the VCXO's 136 frequency and phase such that the VCXO's 136 output signal is phase-locked to the TCXO's 132 output signal.

Similarly, the RF channel of the 2-channel PLL synthesizer may divide the TCXO 132 frequency by an integer $R_{RF}$ to generate a comparison frequency, $F_{comp,RF}$, for phase-locking the RF PLL which includes the VCO 138. The RF channel of the PLL synthesizer 134 also frequency-divides a fed-back portion of the VCO 128 output signal by a fourth divisor, $N_{RF}$, to the same comparison frequency. $N_{RF}$ can be an integer, but in some implementations may be a fractional number (such as 1830/5, for example):

$$F_{comp,RF} = \frac{F_{TCXO}}{R_{RF}} = \frac{F_{VCO}}{N_{RF}}$$

These two signals at $F_{comp,RF}$ are input to a phase detector, the output of which varies proportionally to the phase difference between its input signals. The phase detector's output is then filtered, and is used to control the frequency and phase of the VCO 138, thus phase-locking the VCO 138 to the signal received from the TCXO 132.

In some implementations, the VCXO 136 generates an ADC clock signal based, at least in part, on the signal derived in the IF PLL channel of the 2 channel PLL synthesizer 134 and the VCO 138 generates the transmitter oscillator signal based, at least in part, on the signal derived in the RF PLL channel of the 2 channel PLL synthesizer 134.

The receiver module 104 passes or otherwise directs the baseband signals to the digital signal processor (DSP) 120. The DSP 120 can include any software, hardware, and/or firmware operable to process the filtered, amplified, sampled, and down-converted residual signal, s(t). For example, the DSP 120 may generate control signals for adjusting the cancellation signal used to compensate for leakage signal. In some implementations, the DSP 120 compensates the baseband signals for DC offset and/or phase offset. For example, the reader 100 may include elements that subtract DC offsets and/or de-rotate phase offsets in the baseband signals. Otherwise, these offsets can reduce the efficacy of the cancellation signal in reducing the leakage signal. In other words, the DSP 120 may eliminate, minimize, or otherwise reduce the DC offset and/or the phase offset to reduce error in the cancellation signal. In the case of DC offset, the DSP 120 can, in some implementations, subtract estimates of the DC offsets in the baseband signals such as the in-phase signal and the quadrature signal. For example, the DSP 120 may determine samples (e.g., hundreds of samples) of the DC offset for the baseband signals and generate an average for each baseband signal based, at least in part, on the samples. In this example, the DSP 120 may subtract the DC offset from the corresponding baseband signal during steady state. In regards to the phase offset, the DSP 120 may introduce a phase shift in the baseband, signals to minimize, eliminate, or otherwise reduce the phase shift generated by the elements in the reader 100. In some cases, varying a control value on one baseband signal (e.g., in-phase signal) can produce a change on the other baseband signal (e.g., quadrature signal). This cross-coupling between the two baseband signals can, in some implementations, lead to a more complex control algorithm for compensating for the phase shift offset. In some implementations, the DSP 120 may apply some gain or attenuation to baseband residual signal after the DC/phase offset compensation has been done, then integrate the compensated baseband signal to estimate the CNR control signals $v_i(t)$ and $v_q(t)$. The control signals are passed to the DAC 116.

The transmitter module 106 can include any software, hardware, and/or firmware operable to generate transmission signals for transponders. In the illustrated implementation, the transmitter module 106 includes a DAC 140, a LPF 142, a transmission mixer 144 and a power amplifier 146. The DAC 140 receives a digital signal from the DSP 120 and converts the digital signal to analog signals. For example, the digital signal can encode queries for transponders to identify associated information. The DAC 140 passes the analog signal to the LPF 142 to attenuate higher frequencies than a cutoff frequency from the analog signals. The LPF 142 passes the analog signals to the transmission mixer 144 to upconvert the baseband signals to RF signals. In this case, the transmission mixer 144 receives a signal from the VCO 138 and mixes this signal with the analog signal to generate the RF signal. The power amplifier 146 amplifies the RF signal and directs the amplified signal to the power splitter 110.

Figure 2:
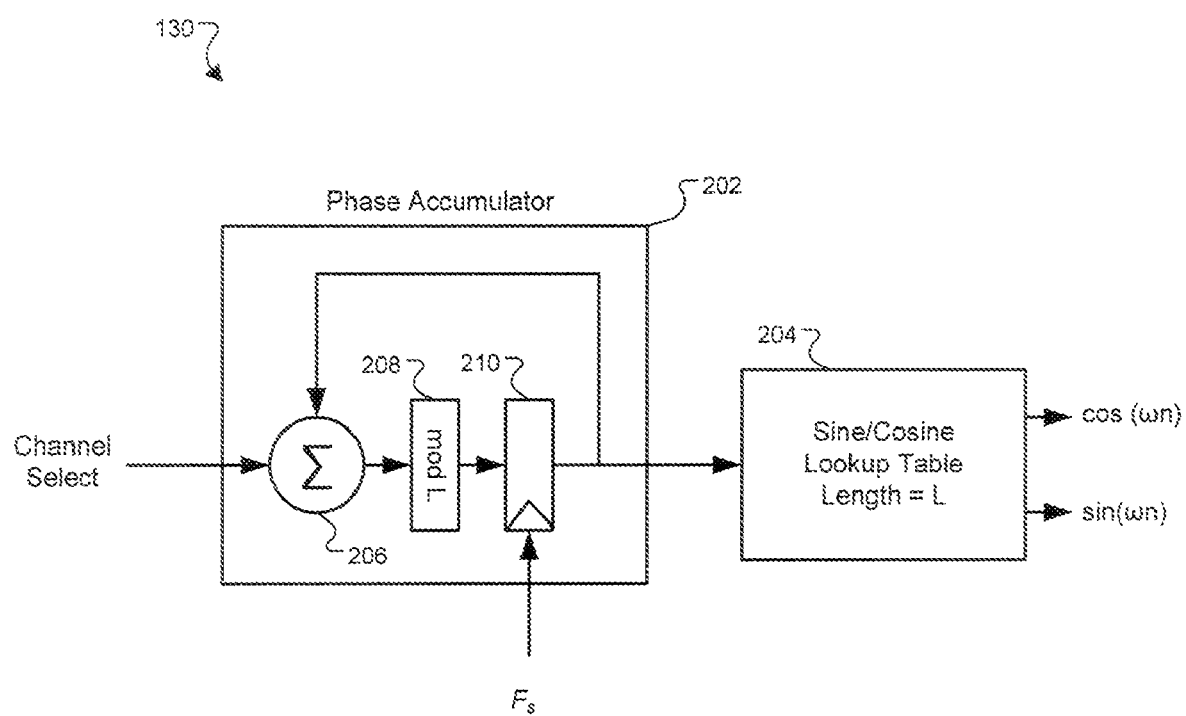
FIG. 2 is a block diagram illustrating an example Digital Frequency Synthesizer (DFS) of FIG. 1.

FIG. 2 illustrates an example implementation of the DFS 130 of FIG. 1 in accordance with some implementations of the present disclosure. As discussed above, the DFS 130 generates a waveform for downconverting the in-phase component and quadrature component to baseband. In the illustrated implementation, the DFS 130 includes a phase accumulator 202 and a sine/cosine lookup table 204. The phase accumulator 202 can include any software, hardware, and/or firmware configured to generate an output used to select waveforms from the sine/cosine lookup table 204. For example, the phase accumulator 202 can, in some implementation, operate as a counter that increments a value based, at least in part, on a phase increment shown as the Channel Select input in FIG. 2. In the illustrated implementation, the phase accumulator 202 includes a summer 206, modulo L phase wrapping logic 208, and an accumulation register 208.

The summer 206 adds a stored accumulation value to an input value identifying a specific channel. The summer 206 passes the value to the modulo L phase wrapping logic 208, which performs modulo L wrapping logic of the summer output between 0 and L-1. The accumulation register 208 stores the value until the next sample clock period. The accumulated value is passed to the sine/cosine lookup table 204 to map the value to a waveform. For example, the lookup table 204 identifies the accumulated value and maps the value to one or more waveform samples Identified in the table 204. The sine/cosine lookup table 204 passes the two signals to the mixer 128 for downconversion to baseband.

In some implementations, the DFS 130 can be clocked at the sampling frequency $F_s$. In this implementation, the output of the accumulator 202 can be used as an index into the sine/cosine table L samples long. In some cases, the minimum frequency resolution can be expressed as follows:

$$\Delta f = \frac{F_s}{L},$$

which can be selected as the channel spacing (e.g., 25 KHz frequency resolution). Using this expression, L is as follows:

$$L = \frac{F_s}{\Delta f}.$$

In the case that, the sampling frequency $F_s$ is an integer multiple of the channel spacing $\Delta f$, the phase increment is an integer. As a result, the output frequency, in some implementations, can be represented exactly, which can lead to no distortion due to phase truncation. In some implementations, the output signals can include distortion due to amplitude quantization. In some implementations, a 16 bit table 204 can yield SNR of 96 dB and SFDR>110 dB.

Figure 3:
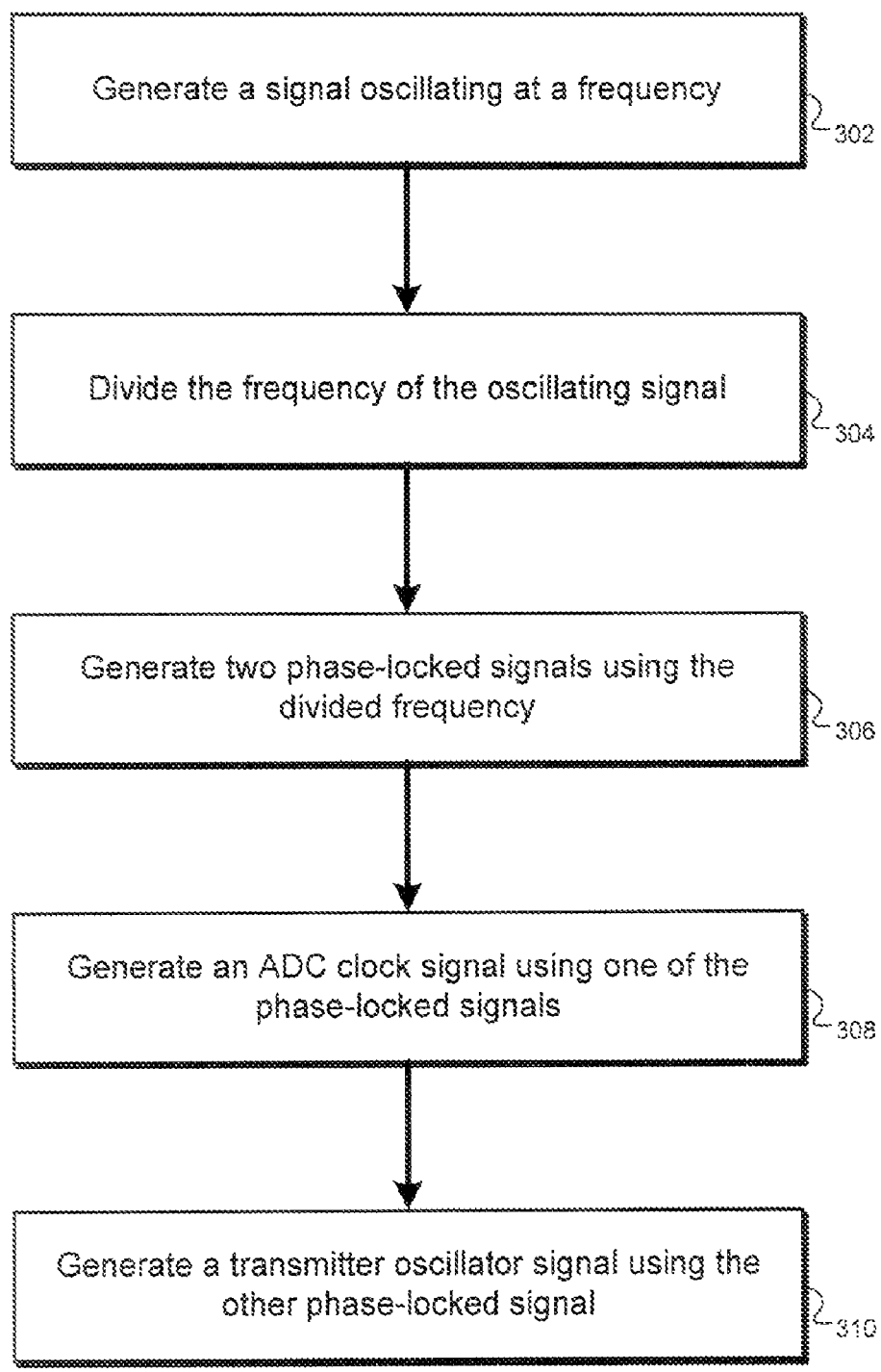
FIG. 3 is a flow chart illustrating an example method for phase locking two signals when directly sampling RF signals.

FIG. 3 is a flowchart illustrating example methods 300 for generating phase-locked ADC clock signal and transmitter oscillator signal in accordance with some implementations of the present disclosure. Generally, method 300 describes an example technique where an initial oscillating signal is divided down to produce two signals used to drive oscillators for the receiver and the transmitter. System 100 contemplates using any appropriate combination and arrangement of logical elements implementing some or all of the described functionality.

Method 300 begins at step 302 where a signal oscillating at a specific frequency is generated. For example, the TCXO 132 can generate an oscillating signal within 10 parts per million (ppm) of frequency accuracy. Next, at step 304, the frequency of the oscillating signal is divided. As for the example, the 2 channel frequency synthesizer 134 divides the frequency of the oscillating signal by an integer. Two phase-locked signals are generated using fee divided frequency at step 306. Again in the example, the 2 channel PLL synthesizer 134 generates a first component to adjust the frequency and phase of the VCXO 136 and a second component to adjust the frequency and phase of the VCO 138, so as to phase-lock both the VCXO 136 and VCO 138 to the TCXO 132, achieving for the entire system the relative frequency accuracy of the TCXO 132 and phase coherence. At step 308, an ADC clock signal is generated based, at least in part, on one of the phase locked signals. Returning to the example, the VCXO 136 generates an ADC clock signal based, at least in part, on the phase locked control signal received from the RF PLL channel of the 2 channel PLL synthesizer 134. Next, at step 310, a transmitter oscillator signal is generated based, at least in part, on the other phase lock control signal. As for the example, the VCO 138 generates a transmitter oscillator signal based, at least in part, on the phase locked control signal received from the RF PLL channel of the 2 channel PLL synthesizer 134.

A number of embodiments of the invention have been described. Nevertheless, it will be understood that various modifications may be made without departing from the spirit and scope of the invention.

What is claimed is:

1. A Radio Frequency IDentification (RFID) reader, comprising:
   an antenna configured to receive Radio Frequency (RF) signals and pass the RF signals to a receive path;
   an Analog-to-Digital Converter (ADC) configured to directly sample RF signals in the receive path in accordance with a clock signal and generate a digital signal;
   a synthesizer module configured to generate the clock signal and an upconversion a signal used to upconvert a transmitter signal, wherein the clock signal and the upconversion signal are phase locked; and
   a Carrier Noise Reduction (CNR) section configured to reduce leakage noise in the receive path.

2. The RFID reader of claim 1, wherein the synthesizer module comprises:
   a reference oscillator configured to generate a signal oscillating at a substantially stable frequency; and
   a frequency synthesizer configured to receive the oscillating signal and generate two control signals to phase-lock the clock signal and the upconversion signal to the reference oscillator, wherein the clock signal and the upconversion signal are phase-locked.

3. The RFID reader of claim 2, wherein the reference oscillator comprises a temperature-compensated crystal oscillator.

4. The RFID reader of claim 2, wherein the reference oscillator comprises a frequency-stable reference oscillator, the synthesizer module further comprising:
   a second oscillator configured to generate the ADC clock signal based, at least in part, on a first of the two phase-locked control signals; and
   a third, oscillator configured to generate the upconversion signal based, at least in part, on a second of the two phase-locked loop control, signals.

5. The RFID reader of claim 4, wherein the second oscillator comprises a voltage controlled crystal oscillator.

6. The RFID reader of claim 4, wherein the third oscillator comprises a voltage controlled oscillator.

7. The RFID reader of claim 1, further comprising:
   a controller configured to generate control signals used to generate an RF signal for reducing leakage signals in the receive path; and
   wherein the CNR module is further configured to subtract the reduction signal from the leakage signal in the receive path.

8. The RFID reader of claim 1, wherein the directly sampled RF signal is equal to or greater than 800 MegaHertz (MHz).

9. The RFID reader of claim 1, further comprising a Band Pass Filter (BPF) configured to permit the desired frequency band of RF signals received by the antenna to pass to the ADC while rejecting undesired frequencies.

10. The RFID reader of claim 1, wherein leakage transmitter signal power is reduced by at least 20 dB.

11. The reader of claim 1, further comprising:
a Digital Frequency Synthesizer (DFS) configured to generate waveforms based, at least in part, on index associated with accumulated phase; and
a mixer configured to mix the digital signal and the generated waveform to down convert the digital signal to a baseband signal for demodulation.

12. The reader of claim 11, wherein the DFS includes a sinusoid table with a length equal to a frequency of the clock signal divided by the channel spacing.

13. A method, comprising:
receiving Radio Frequency (RF) signals and pass the RF signals to a receive path;
directly sampling RF signals in the receive path in accordance with a clock signal to generate a digital signal;
generating the clock signal and an upconversion a signal used to upconvert a transmitter signal, wherein the clock signal and the upconversion signal are phase locked; and
reducing leakage noise in the receive path.

14. The method of claim 13, wherein generating the clock signal and the upconversion signal comprises:
generating a signal oscillating at a substantially stable frequency; and
generating two control signals to phase-lock the clock signal and the upconversion signal to a reference oscillator, such that the clock signal and the upconversion signal are mutually phase-locked.

15. The method of claim 14, wherein the oscillating signal is generated from a temperature compensated crystal oscillator.

16. The method of claim 14, wherein generating the clock signal and the upconversion signal comprises:
generating an ADC clock signal based, at least in part, on a first of a two phase-locked-loop control signals; and
generating the upconversion signal based, at least in part, on a second of the two phase-locked loop control signals.

17. The method of claim 16, wherein the ADC clock signal is generated from a voltage controlled crystal oscillator.

18. The method of claim 16, wherein the upconversion signal is generated from a voltage controlled oscillator.

19. The method of claim 13, further comprising:
generating control signals used to generate an RF signal for reducing leakage signals in the receive path; and
subtracting the reduction signal from the leakage signal in the receive path.

20. The method of claim 13, wherein the directly sampled RF signal is equal to or greater than 800 MegaHertz (MHz).

21. The method of claim 13, further comprising filtering out a band of the RF signals in the receive path prior to directly sampling the band of the RF signals.

22. The method of claim 13, wherein leakage transmitter signal power is reduced by at least 20 dB.

23. The method of claim 13, further comprising:
a Digital Frequency Synthesizer (DFS) configured to generate waveforms based, at least in part, on index associated with accumulated phase; and
a mixer configured to mix the digital signal and the generated waveform to down convert the digital signal to a baseband signal for demodulation.

24. The method of claim 23, wherein the DFS includes a sinusoid table with a length equal to a frequency of the clock signal divided by the channel spacing.

* * * * *

UNITED STATES PATENT AND TRADEMARK OFFICE
CERTIFICATE OF CORRECTION

PATENT NO. : 7,772,997 B2  Page 1 of 1
APPLICATION NO. : 11/843781
DATED : August 10, 2010
INVENTOR(S) : Thomas J. Frederick et al.

It is certified that error appears in the above-identified patent and that said Letters Patent is hereby corrected as shown below:

Col. 8, line 45, in claim 4, delete "third," and insert -- third --.

Col. 8, line 47, in claim 4, delete "control," and insert -- control --.

Signed and Sealed this

Twenty-third Day of November, 2010

David J. Kappos
*Director of the United States Patent and Trademark Office*